United States Patent [19]
Hubert et al.

[11] Patent Number: 4,956,042
[45] Date of Patent: Sep. 11, 1990

[54] PROCESS AND APPARATUS FOR EMBRITTLING AND SUBSEQUENTLY REMOVING AN OUTER PROTECTIVE COATING OF A PIPE OR PIPELINE

[75] Inventors: Jean-Luc Hubert, Willowbrook, Ill.; Joseph M. Chitty, Lake Charles; William A. Ellett, Monroe, both of La.

[73] Assignee: Liquid Air Corporation, Walnut Creek, Calif.

[21] Appl. No.: 265,772

[22] Filed: Nov. 1, 1988

[51] Int. Cl.$^5$ .................... B32B 31/18; B32B 31/22
[52] U.S. Cl. ............................ 156/344; 62/62; 83/15; 83/170; 118/315; 156/80; 156/155; 156/498; 156/584; 225/93.5; 264/28; 427/398.3
[58] Field of Search ............ 62/62; 83/15, 170; 156/80, 155, 344, 498, 584; 225/93.5; 264/28; 427/398.3; 118/313, 315

[56] References Cited

U.S. PATENT DOCUMENTS

| | | |
|---|---|---|
| 3,878,978 | 4/1975 | Martinek . |
| 3,934,379 | 1/1976 | Braton et al. ................... 51/319 |
| 3,936,922 | 2/1976 | Blackstone et al. . |
| 4,220,012 | 9/1980 | Brister . |
| 4,255,216 | 3/1981 | Conant et al. . |
| 4,267,699 | 5/1981 | Bahrenburg . |
| 4,312,156 | 1/1982 | McWhorter . |
| 4,487,643 | 12/1984 | Ellett ................................ 156/80 |
| 4,491,484 | 1/1985 | Williams . |
| 4,627,197 | 12/1986 | Klee et al. . |
| 4,654,107 | 3/1987 | Ritter . |

Primary Examiner—Robert A. Dawson
Attorney, Agent, or Firm—Oblon, Spivak, McClelland, Maier & Neustadt

[57] ABSTRACT

The protective coating on a pipe is embrittled and removed by enclosing a portion of the pipe in a body defining an annular space around the protective coating. A pressurized liquid nitrogen cryogen is expanded within this annular space for a sufficient time to lower the temperature of both the protective coating and the underlying pipe to a temperature below the temperature of embrittlement of the coating.

31 Claims, 4 Drawing Sheets

PROCESS AND APPARATUS FOR EMBRITTLING AND SUBSEQUENTLY REMOVING AN OUTER PROTECTIVE COATING OF A PIPE OR PIPELINE

BACKGROUND OF THE INVENTION

1. Field of the Invention:

The present invention is directed to processes and apparatuses for embrittling and removing an outer protective coating of a pipe or pipeline, and in particular processes and apparatuses for the continuous embrittlement and removal of such outer protective coatings at a speed matching that of typical pipeline traveling coating removing equipment.

2. Brief Description of the Related Art:

In maintaining and repairing pipelines, it is often necessary to remove the protective coating which surrounds the pipes constituting the pipeline. Simply scraping off the coating is both laborious and not fully effective because of the tacky nature of those coatings at the usual temperatures at which the cleaning operations are performed (for example, in South and Southwest USA, summer months), and so it has been proposed to cool the coating to a temperature where the coating is brittle prior to attempting to remove the coating.

An example of a method and apparatus for embrittlement of a pipe coating is shown in U.S. Pat. No. 4,487,643 to Ellett. This patent discloses a batch type process and apparatus in which a flexible sleeve is placed on a selected pipe coating section and sealed both along its length and at its ends. The volume defined by the pipe and the sleeve is then filled with the cryogen carbon dioxide ($CO_2$) in order to cool the coating to its embrittlement temperature, after which embrittled coating is removed by being struck with a hammer.

The technique of Ellett has been found, however, to have several shortcomings. First, Ellett fails to recognize that a complete and even coating embrittlement (i.e., from the outside skin of the coating down to the bonding interface between the coating and the steel pipe) requires that the underlying steel pipe also be at the embrittlement temperature of the coating, since otherwise the steel pipe, which is a substantial heat source, will heat the inner layers of the coating to above the embrittlement temperature before coating removal is completed. However, cooling both the coating and the underlying steel pipe to a temperature below the embrittlement temperature in a short period of time is impractical by use of a $CO_2$ cryogen. Because carbon dioxide has a triple point above atmospheric pressure, the enclosure within the sleeve of Ellett must be pressurized to above 100 psig in order to avoid the creation of a block of carbon dioxide snow within the enclosure. Such snow would form a stable calefaction layer around the coated pipe whose insulating properties, together with the insulating properties of the coating itself, would make the rapid cooling of the pipe impossible. Moreover, the gradual vaporization of the $CO_2$ snow would form gas pockets within the sealed enclosure of Ellett at locations far from the exhaust ports thereof and separated from these ports by the $CO_2$ snow. There would result increased local pressures within the enclosure which might locally rupture the enclosure.

Although the use of other cryogens, particularly very low temperature cryogens such as liquid nitrogen (LN2 having a vaporization temperature at $-196°$ C.) for cooling an organic coating prior to removal from an object is known, for example from U.S. Pat. No. 3,934,379, the use of such other cryogens would not be obvious from Ellett because the low temperatures would embrittle the synthetic materials of the sleeve itself.

Finally, Ellett has limited practical utility because it is a batch type process which can be used to embrittle and then remove the coating of only one section of a pipe at a time; the embrittlement of the coating of another pipe section would require the removal of the sleeve and repositioning of the same at another location. One could not use the sleeve of Ellett for continuous embrittlement of a pipe coating both because of the need to apply and reapply the sleeve at different locations, because Ellett provides no teaching as to design parameters necessary for continuous embrittlement, i.e., the length of the enclosure, the height of the enclosure, etc., and because Ellett provides no teaching as to necessary related equipment such as the movement driving force for the sleeve if it were continuously movable and for the cryogen source, the interconnection between scraping machine and sleeve, etc.

SUMMARY OF THE INVENTION

It is an object of the present invention to provide a process for the embrittlement and subsequent removal of the protective outer coating of a pipe.

It is a further object of the invention to provide a continuous process for the embrittlement of the protective outer coating of a pipe.

It is a further object of the invention to provide an apparatus for embrittling the outer protective coating of a pipe.

It is a further object of the invention to provide an apparatus capable of continuously embrittling the protective outer coating of a pipe.

It is a further object of the invention to provide an apparatus capable of being combined with typical pipeline traveling equipment.

It is a further object of the invention to couple the embrittling apparatus with related apparatus to drive and supply the apparatus which continuously embrittles the protective outer coating of a pipe.

These, and other, objects are achieved according to the present invention by a process including the steps of surrounding a portion of a pipe in a tunnel means so as to define an annular space with open ends around the protective coating, and expanding a liquid nitrogen cryogen into the space so as to embrittle the protective coating by deposition of a film of liquid nitrogen droplets onto the coated surface of the pipe, thereby achieving film boiling.

The above objects are also achieved by an apparatus comprising an annular tunnel means having a bore positionable in enclosing relationship with a portion of a pipe so as to define an annular space with open ends around the protective coating of the enclosed portion of the pipe, and means for introducing liquid nitrogen into the bore so as to embrittle the protective coating.

According to the process of the invention, the process includes the step of maintaining the tunnel means in surrounding relationship to the portion of the pipe for a certain time sufficient for the portion of the pipe and the protective coating thereof to fall below an embrittlement temperature of the protective coating.

According to the apparatus of the invention, the tunnel means comprises a rigid, insulated cylindrical body and means for permitting the body to freely move along the length of a pipe in the bore.

According to further features of the invention, the arrangement of the nozzles is uniform and provided so as to maximize the cooling rate. Four two-foot tunnel body sections are axially arranged, end-to-end, to meet the cooling requirements at a given advance speed of the tunnel body.

According to further features of the invention, the tunnel means are pushed along the pipe by a pipeline traveling cleaning machine travelling closely behind, whereby means are provided to interconnect the pipeline traveling cleaning machine and the pipeline traveling embrittlement tunnel means. This assures that the coating material can be scraped from the pipeline while it remains below the embrittlement temperature.

According to further features of the invention, means are provided to supply the tunnel means with liquid cryogen, said means consisting in a mobile storage tank unit with suitable mobility means, of suitable size, and with a suitable vaporizer to maintain the tank head pressure, which is the liquid cryogen flow driving force, at a suitable level and in a suitably insulated flexible cryogenic hose of suitable length.

According to further features of the invention, means are provided to pull the mobile storage tank essentially parallel to and at the same speed as the tunnel means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

A preferred embodiment of the invention will now be described with reference to the attached drawings, in which the same reference numerals are used to represent the same or corresponding elements throughout the various views.

The apparatus of the invention has as a main component a tunnel means which is formed of a rigid, insulated cylindrical tunnel body 2, defined by two semi-cylindrical body halves 2a and 2b which are bolted together at axially extending top and bottom flanges 4 and 6. An optional shroud 8 is secured to a flange 30 at the rear end of the tunnel body 2 for restricting the rear end opening of the tunnel body when a pipe section 10 is positioned therein. Means generally designated as 12 are provided for supplying liquid nitrogen cryogen to a bore defined by the interior of the tunnel body.

Figure 3:
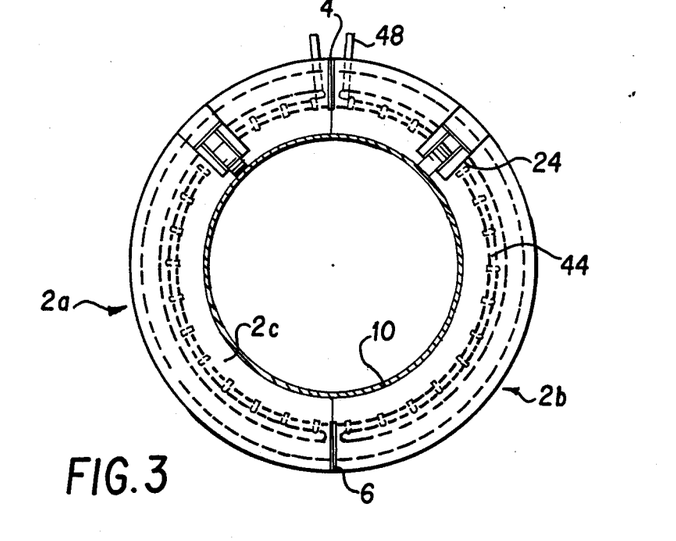
FIG. 3 is an end view of the apparatus according to the invention.
Figure 4:
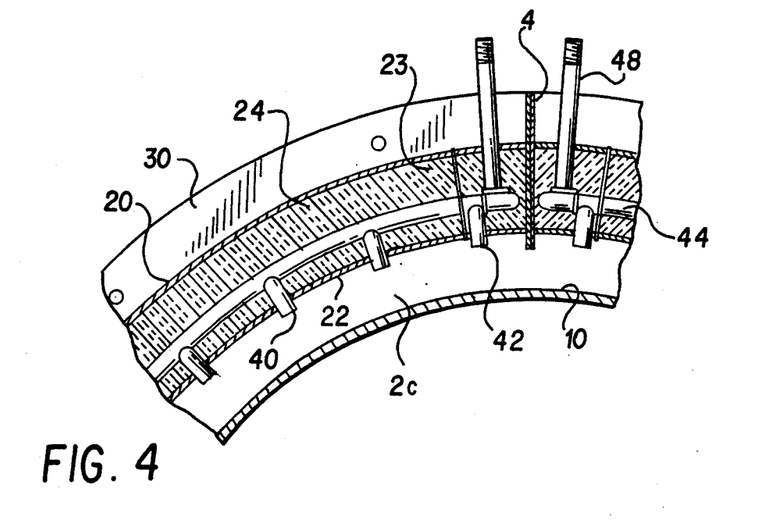
FIG. 4 is a partial sectional end view of the apparatus according to the invention.

As best seen in FIGS. 3 and 4, each of the body halves 2a and 2b is formed of a semi-cylindrical rigid outer shell 20 and a coaxial semi-cylindrical rigid inner shell 22, each of which may be formed of ¼ inch thick aluminum between which is positioned a rigid insulating material 24, for example, foam in place polyurethane insulation. The two body halves 2a and 2b can be bolted together at the flanges 4 and 6 around a section of a pipe whose coating is to be embrittled and removed.

Figure 6:
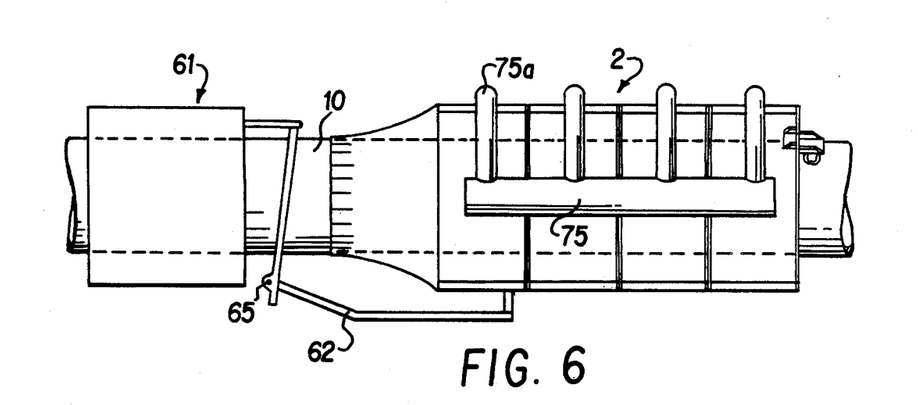
FIG. 6 is a view of the connection between the embrittlement apparatus and the standard pipeline traveling equipment.

A tunnel body of the desired length can be formed by bolting two or more of the tunnel bodies 2 end-to-end at the flanges 30. The tunnel body is connected to a conventional pipe scraper 61 by two rods 62 pivotally connected to the scraper about transverse horizontal axes 65, and is positioned closely in advance of the scraper in the direction of movement (FIG. 6). The scraper 61 could move as fast as 12 feet per minute, and the length of the tunnel body could be as great as 8 to 16 feet. Any length greater than this does not permit the tunnel body to travel around bends of maximum allowable curvature in the pipe 10.

A wheel assembly 24 is attached to an upper portion of ends of each of the two body halves 2a and 2b. The four wheel assemblies have caster wheels 24a which rest on the outer surface of the pipe 10 and permit free movement of the tunnel body 2 along the pipe while maintaining an annular space 2c between the tunnel body and the pipe.

The optional shroud 8 at the rear of the tunnel is formed of two flexible ultra high moleculor weight polyethylene half shrouds which are each attached to a flange 30 at an end of one of the body halves 2a and 2b, and are sealed at their abutting edges, for example by the tape 32. Longitudinal slits 34 in the ends of the shroud make it unnecessary to manufacture said shroud to very precise tolerances. The purpose of the shroud located at the rear of the tunnel is to restrict the opening at the rear end of the tunnel and thereby avoiding bits of scraped coating forcefully projected from the scraper from entering the tunnel annular enclosure. The shroud is optional since an inwardly extended flange 30 has roughly the same result.

The liquid nitrogen cryogen is introduced into the annular space 2c between a pipe 10 and the inner shell 22, where it expands from its above atmospheric pressure to atmospheric pressure, by the cryogen supplying means 12 which include conduit means and a plurality of full cone wide angle nozzles 40 (such as Sprayinq Systems model GG2.8W) evenly distributed within the bore of the tunnel body 2. Each of the nozzles is mounted on a short radially directed pipe section 42 (half coupling) which extends from a circumferential header pipe 44. The purpose of the nozzles is to deposit a thin film of liquid nitrogen droplets onto the coated surface of the pipe, and not to create a bath of boiling liquid nitrogen around the coated pipe or a portion thereof.

Figure 5:
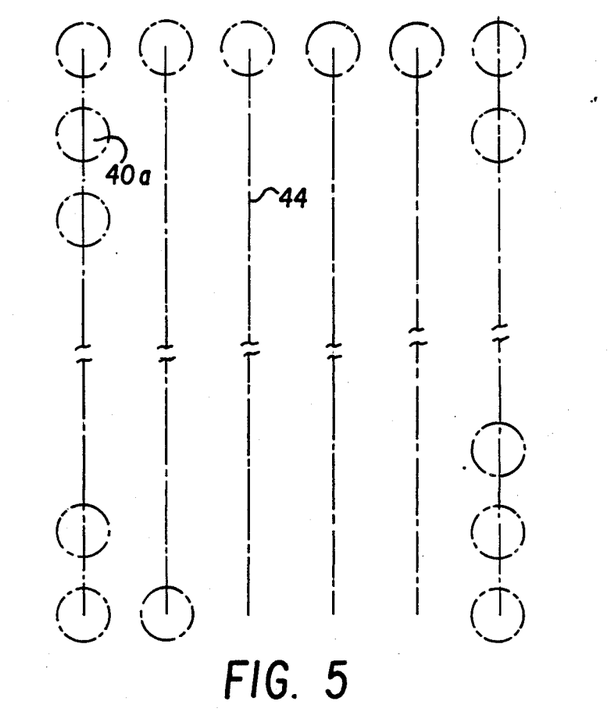
FIG. 5 is a developed view of a pipe section showing the relative positions of the nozzles on the pipe according to the invention.

FIG. 5 is a developed view showing spray areas 40a produced on the pipe coating by the nozzles 40 when the header pipes 44 are spaced by 4" and there are 15 nozzles on each header pipe (30 nozzles for each axially aligned pair of header pipes). The spray areas have a radius of approximately 1.75 inches at a distance of 2.5 inches between the nozzles and the pipe surface.

Figure 1:
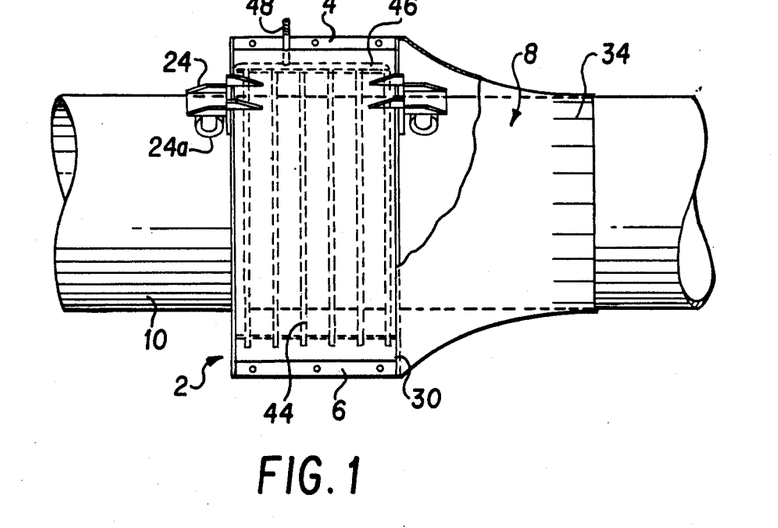
FIG. 1 is a front elevation view of one module of a pipe coating embrittlement device according to the invention, as mounted on a pipe section.
Figure 2:
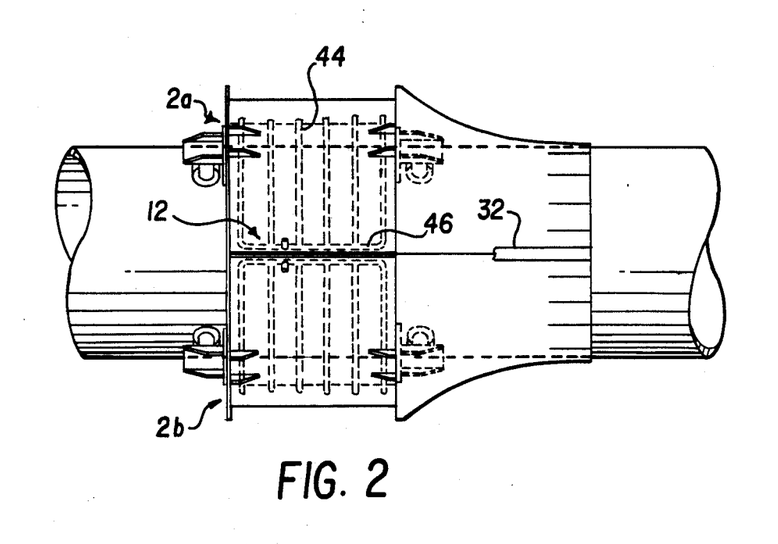
FIG. 2 is a plan view of one module of a pipe coating embrittlement device according to the invention, as mounted on a pipe section.

As best seen in FIGS. 1 and 2, a plurality of the circumferential distributing header pipes 44 are positioned within the insulation 24 of each body half and connect to distributing manifold 46 adjacent the flange 4. Clips 23 fix each circumferential header pipe 44 to the shells 20 and 22 in order to fix the position of the cryogen means 12 relative to the tunnel body 2. Each axial distributing manifold 46 is connected to an insulated manifold 75 via the connector pipe 48 and insulated pipes 75a. When the two body halves 2a and 2b are bolted together, the array of circumferential header pipes 44 of the two halves form an axial series of annular conduits which surround the pipe 10 and provide liquid nitrogen to the nozzles 40 so as to rapidly cool the pipe 10.

In use, as seen in FIG. 6, tunnel body 2 is rigidly attached to a conventional pipe scraper 61 (shown schematically in the Figure) by means of the two rods 62, and is positioned closely in advance of the scraper. The pipe scraper moves at a set speed and could be that manufactured by CRC/Evans International Equipment Company of Tulsa, OK, but is not limited thereto.

Figure 7:
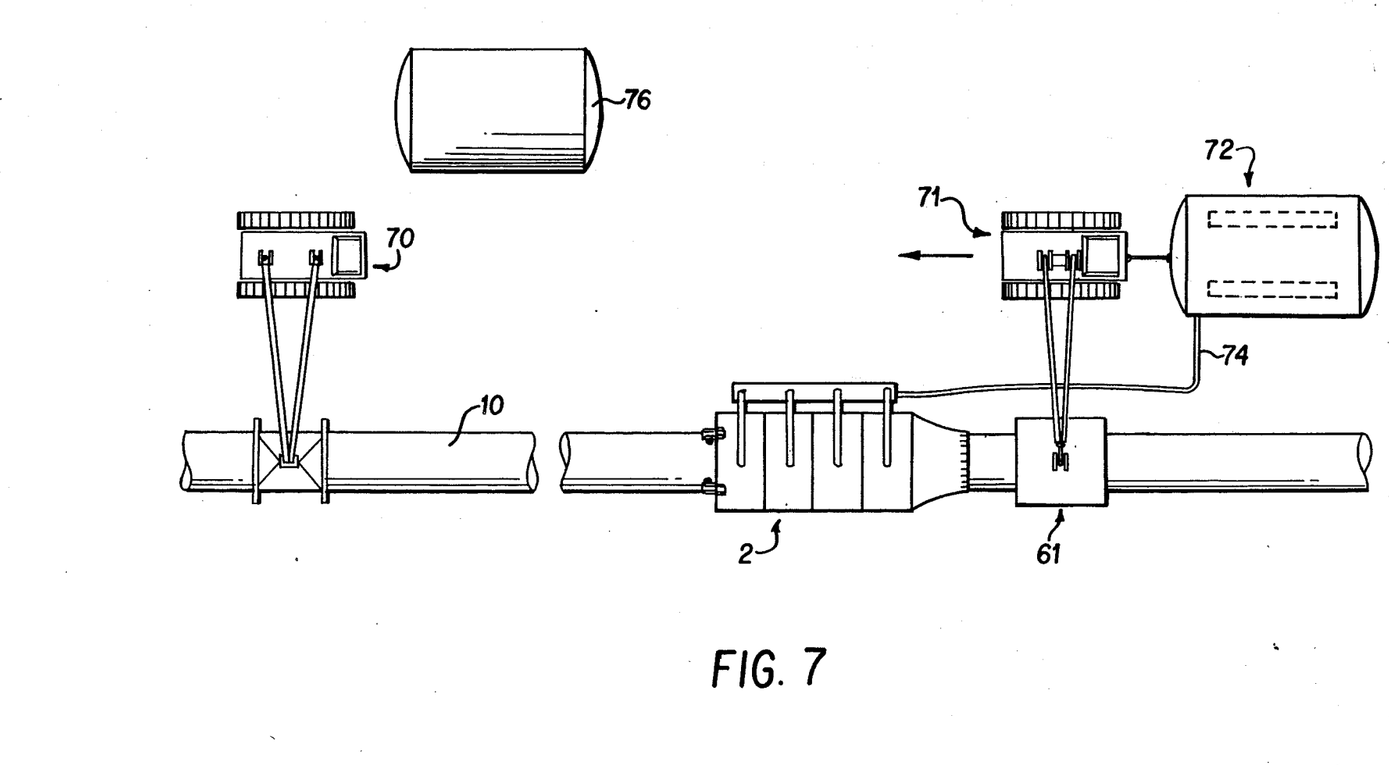
FIG. 7 is a schematic plan view of all apparatus required by the complete process.

As schematically seen in FIGS. 6 and 7, the tunnel body is pushed along the pipe by the scraper machine 61 which has its own engine for driving the scraper machine along the pipeline. A pair of side booms each consist of a conventional hoist mounted on a tracked vehicle. One side boom 70 in front of the tunnel lifts the pipeline while a second side boom 71 supports and balances the scraping machine 61. That second side boom 71 is moving at a manually controlled speed and orientation such that it moves at the same speed as the scraper and tunnel assembly and such that the scraper and tunnel assembly does not tilt to any excessive degree from the vertical axis. The second side boom 71 also pulls a liquid nitrogen storage tank 72 of suitable size, but no less than 2000 gal., which is mounted on a suitable number of pairs of tracks (one pair suffices for a 2000 gallon storage tank). The tank 72 has a vaporizer (not shown) of suitable size to vaporize enough liquid nitrogen to maintain a constant head pressure within the tank 72 while liquid nitrogen flows out of the tank to the tunnel body through a flexible hose 74 of suitable diameter (but no less than 2") and of suitable length (but no more than 30 feet), or a combination of flexible hose and rigid pipe segments. The flexible hose, or a combination of flexible hose and rigid pipe segments, is covered by an insulation of suitable thickness (but no less than 1") and of suitable material such as Armaflex but preferably such as mineral wool covered by a suitable vapor barrier. The preferred insulation material presents the advantage of not becoming brittle and therefore of keeping its integrity during the unavoidable movements of the flexible hose or flexible hose segments during the operation.

As the tunnel body moves along the pipe, together with and while being pushed by the scraper, and essentially in unison with the mobile cryogen source, liquid nitrogen is delivered from the cryogen source 72 to the nozzles 40 through the flexible hose 74 or combination flexible hose and rigid pipe segments, the manifold 75, the axial distributing manifolds 46, the semi-circumferential header pipes 44 and the half couplings 42. The nozzles 40 then expand the liquid nitrogen from above atmospheric pressure (preferably no less than 10 psig, no more than 40 psig) of the tank (minus pressure drop in the $LN_2$ flow system) to the atmospheric pressure within the annular space enclosed by the tunnel body 2, thereby creating conical jets of liquid nitrogen droplets mixed with nitrogen flash gas which impact the coated surface of the pipe 10 with a significant kinetic energy, said kinetic energy being sufficient to help in rupturing and destabilizing the calefaction layer created on the coated surface of the pipe by the boiling liquid nitrogen droplets, thereby enhancing the heat removal rate. The thin film of liquid nitrogen droplets deposited on the coated surface of the pipe 10 together with the kinetic energy of the impacting liquid droplets and gas sustain a saturated nucleate film boiling with reduced dryout phenomena on the surface of the pipe, thereby rapidly reducing the temperature of the pipe and of its coating, with a very sharp temperature gradient in the coating and a very flat temperature gradient in the steel. The distance "d" between nozzles and pipe, or spray height, is critical to the speed of heat removal or, inversely, to the efficiency of the process. The preferred height "d" for extremely fast heat removal is 2.5" to 3", but should not be smaller than 2.5", and should not be greater than 8".

The invention has several features that optimize the flow of liquid nitrogen through the liquid nitrogen delivery system and through the nozzles, said features aiming at reducing or eliminating any gas phase within the liquid stream. First of those features consists in filling the mobile storage unit 72 with liquid nitrogen from a standard delivery truck (76 of FIG. 7) which is normally saturated liquid at around 5 psig, then raising the pressure in the tank 72 to preferably between 10 and 40 psig, thereby utilizing subcooled rather than saturated liquid nitrogen. Second of those features consists in sizing the diameter of the various liquid nitrogen piping components and the thickness of the insulation on those various piping components in such a way that the sum of the effects of pressure drop within and heat leak into those piping components remains less than the amount of subcooling available from the tank. Finally, the third of those features is the use of the half couplings 42 welded onto the drilled headers 44 in which the nozzles 40 are screwed, rather than screwing the nozzles 40 directly into the headers 44, thereby avoiding the vena contracta and related pressure drop and cavitation which would otherwise be created by protruding nozzle bodies projecting into the circumferential headers 44.

EXAMPLE 1

An apparatus according to this embodiment of the invention was formed of a tunnel body 8 feet long by connecting four of the two foot length tunnel bodies 2 end-to-end at the end flanges 30 and having the circumferential spray header pipes 44 every 4 inches along the length, with 30 nozzles on each ring formed by a pair of circumferential header pipes 44. However, axially alternating rings formed by pairs of header pipes 44 had plugs rather than nozzles, so as to provide one header fitted with nozzles every 8", one header fitted with plugs every 8", those headers alternating every 4" for processing a 30 inch pipe 10. Liquid nitrogen was supplied from a 2,000 gallon track mounted tank 72 moving parallel to the pipe 10 and at the same speed as the tunnel bodies 2. The apparatus of the invention and the scraper were moved together along the pipe coated with 70-100 mils thick coal tar at various speeds and liquid nitrogen storage tank pressures. The temperature of the steel and coating was reduced from an initial temperature of 110° F. to 30° F. when moving at 12 feet/min with a storage pressure of 23 psig. The temperature of the steel and coating was reduced from an initial temperature of 85° F. to 30° F. or less when moving at 6 feet/min with a storage pressure of less than 7 psig. As a result, the pipe was successfully cleaned in both cases.

EXAMPLE 2

The same equipment was used on another type of coating, commonly referred as white tapecoat, with an embrittlement temperature much lower than that of coal tar (−40° F. versus +40° F.). The temperature of the pipe and the 50 mils thick coating was reduced from an initial temperature of 85° F. to −50° F. when moving at 3.5 feet/min and with a storage pressure of 14 psig. As a result, the pipe was successfully cleaned.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for embrittling and subsequently removing an outer protective coating of at least a pipe section of a transmission pipeline, comprising the steps of:
   enclosing a portion of the pipe in a tunnel means so as to define an annular space around said protective coating;
   expanding a pressurized liquid nitrogen cryogen into said space in such a way as to embrittle the protective coating by deposition of a layer of liquid nitrogen droplets onto the coated surface of the pipe; and
   maintaining said tunnel means in surrounding relationship to said portion of the pipe for a certain time sufficient for said portion of the pipe and the protective coating on said portion of the pipe to fall below en embrittlement temperature for the protective coating.

2. The process of claim 1 including the step of moving said tunnel means along said pipe at such a speed that any portion of said pipe enclosed by said tunnel is enclosed for at least said certain time.

3. The process of claim 1 wherein said step of expanding a pressurized liquid nitrogen cryogen comprises discharging said cryogen as sprays onto said pipe from a plurality of nozzles distributed in said annular space.

4. The process of claim 3 wherein said tunnel means is moved along said pipe in a continuous fashion.

5. An apparatus for embrittling an outer protective coating of a pipe; comprising:
   annular tunnel means having a bore positionable in enclosing relationship with a portion of a pipe so as to define an annular space with essentially open ends around the protective coating of the enclosed portion of the pipe; and
   means for expanding pressurized liquid nitrogen cryogen into said bore so as to embrittle the protective coating,
   wherein said means for expanding said cryogen into said bore comprises a plurality of wide angle full cone nozzles in said bore and conduit means mounted on said tunnel body for supplying said cryogen to said nozzles.

6. An apparatus for embrittling an outer protective coating of a pipe, comprising:
   annular tunnel means having a bore positionable in enclosing relationship with a portion of a pipe so as to define an annular space with essentially open ends around the protective coating of the enclosed portion of the pipe; and
   means for expanding pressurized liquid nitrogen cryogen into said bore so as to embrittle the protective coating,
   wherein said tunnel means comprise:
   at least two rigid, insulated and coaxial cylindrical tunnel bodies connected end to end; and
   means for permitting said tunnel bodies to freely move along the length of a pipe in said bore.

7. The apparatus of claim 6 including shroud means for restricting the rear end opening of said annular space.

8. The apparatus of claim 6 wherein said means for permitting said tunnel body to freely move comprise a plurality of wheels mounted on said tunnel body and rotatably engageable with a pipe in said bore.

9. The apparatus of claim 8 wherein said wheels also comprise means for preventing said tunnel body from contacting a pipe in said bore, so as to maintain said annular space in an annular form.

10. The apparatus of claim 6 wherein said tunnel body comprises two rigid coaxial cylinders and insulation filling a region between said cylinders.

11. The apparatus of claim 6 wherein said nozzles are arranged so as to provide a substantially even distribution of said cryogen to pipe portion in said bore.

12. The apparatus of claim 6 wherein said tunnel body comprises two semi-cylindrical body halves releasably connected to one another and said conduit means comprises two independent sets of conduits, one of said sets of conduits being mounted on each of said halves.

13. The apparatus of claim 6 wherein said tunnel body comprises two semi-cylindrical body halves releasably connected to one another.

14. The process of claim 2 wherein said certain time is sufficient for the temperature of the pipe to drop to around 40° F. to 50° F. when the pipe is coated with coal tar.

15. An apparatus for embrittling an outer protective coating of a pipe, comprising:
   annular tunnel means having a bore positionable in enclosing relationship with a portion of a pipe so as to define an annular space with essentially open ends around the protective coating of the enclosed portion of the pipe; and
   means for moving said tunnel body along the length of a pipe in said bore, said means for moving comprising a motorized pipeline cleaning means connected to said tunnel body at a position behind said tunnel body in a direction of movement of said tunnel body.

16. The apparatus of claim 15 wherein said pipeline cleaning means is a scraper means, in combination with a mobile liquid nitrogen storage tank operatively connected to said cryogen expanding means via flexible delivery means.

17. A process according to claim 1, further comprising the step of removing the embrittled outer protective coating with an automated scraping machine.

18. A process according to claim 1, further comprising the step of scraping the embrittled outer protective coating.

19. The process in claim 3 wherein the cryogen is sprayed so as to deposit a film of liquid nitrogen droplets on the coated surface of the pipe, thereby providing semi-continuous film boiling of liquid nitrogen on the coated surface of the pipe.

20. The process in claim 19 wherein the sprayed cryogen has sufficient kinetic energy created by the expansion through the nozzles to rupture and destabilize the calefaction layers created by the film boiling of $LN_2$ that would otherwise slow the heat transfer process.

21. The process of claim 3 including the step of supplying via delivery means said cryogen from a mobile storage tank of no less than 2000 gallons and having a tank head pressure of suitable value.

22. The process of claim 21 including the step of using a side boom for pulling the mobile storage tank unit and balancing the scraping machine.

23. The process of claim 21 wherein the tank head pressure is maintained constant at a selectable level between 10 and 40 psig.

24. The process of claim 21 wherein the tank is initially filled with near 0 psig liquid nitrogen, and then raised in pressure so as to provide subcooled $LN_2$ instead of saturated $LN_2$.

25. The process of claim 24 including the step of avoiding the formation of a gas phase in said delivery means by using subcooled $LN_2$ together with correctly sized diameter of piping components of said delivery means and a thickness of insulation over said piping components, and together with providing half couplings at a transition between a header and said nozzles so as to avoid vena contracta due to protruding nozzle bodies into the headers, so as to provide a flow of pure liquid nitrogen through said delivery means.

26. The apparatus of claim 16 wherein said storage tank holds at least 2000 gallons and includes vaporizer means for maintaining a tank head pressure of a suitable value.

27. The apparatus of claim 26 wherein said flexible delivery means includes both flexible and rigid segments.

28. The apparatus of claim 27 including mineral wool insulation for insulating said flexible delivery means.

29. The apparatus of claim 16 including side boom means for both balancing said scraper means and pulling said storage tank.

30. The apparatus of claim 5 wherein a distance d between said nozzle and the pipe is between 2.5 inches and 8 inches.

31. The apparatus of claim 30 wherein distance d is between 2.5 inches and 3 inches.

* * * * *

UNITED STATES PATENT AND TRADEMARK OFFICE
CERTIFICATE OF CORRECTION

PATENT NO.   :   4,956,042
DATED        :   SEPTEMBER 11, 1990
INVENTOR(S)  :   HUBERT ET AL

It is certified that error appears in the above-identified patent and that said Letters Patent is hereby corrected as shown below:

On the title page:

Please change inventors from:   [Jean-Luc Hubert, Willowbrook, Ill; Joseph M. Chitty, Lake Charles; William A. Ellett, Monroe, both of La.]

to:   --Jean-Luc Hubert, Willowbrook, Ill.; Joseph M. Chitty, Lake Charles, La.--

Signed and Sealed this

Twenty-eighth Day of January, 1992

Attest:

HARRY F. MANBECK, JR.

*Attesting Officer*     *Commissioner of Patents and Trademarks*